United States Patent
Wortberg

(10) Patent No.: US 11,603,053 B2
(45) Date of Patent: Mar. 14, 2023

(54) ELECTRICAL CONNECTION ARRANGEMENT FOR CONNECTING FREELY CONFIGURABLE ELECTRICAL COMPONENTS IN A VEHICLE

(71) Applicant: Lisa Draexlmaier GmbH, Vilsbiburg (DE)

(72) Inventor: Michael Wortberg, Dorfen (DE)

( * ) Notice: Subject to any disclaimer, the term of this patent is extended or adjusted under 35 U.S.C. 154(b) by 0 days.

(21) Appl. No.: 17/403,909

(22) Filed: Aug. 17, 2021

(65) Prior Publication Data

US 2022/0055551 A1  Feb. 24, 2022

(51) Int. Cl.
*B60R 16/02* (2006.01)
*H04L 12/40* (2006.01)

(52) U.S. Cl.
CPC .......... *B60R 16/0207* (2013.01); *H04L 12/40* (2013.01); *H04L 2012/40273* (2013.01)

(58) Field of Classification Search
CPC ............ B60K 2370/44; B60K 2370/46; B60R 16/0207; B60R 16/03; H04L 12/40; H04L 2012/40273
See application file for complete search history.

(56) References Cited

U.S. PATENT DOCUMENTS

| | | | | |
|---|---|---|---|---|
| 5,610,454 A * | 3/1997 | Nishikawa | .......... | B60R 16/0207 174/72 A |
| 6,441,510 B1 * | 8/2002 | Hein | ..................... | B60R 21/216 307/9.1 |
| 7,107,197 B1 * | 9/2006 | Shropshire | .............. | G06F 30/18 703/7 |
| 7,529,638 B2 * | 5/2009 | Sawai | ..................... | G06F 30/23 702/6 |
| 2019/0173240 A1 * | 6/2019 | Nakamura | ......... | H01R 13/6691 |
| 2019/0391197 A1 * | 12/2019 | Ohishi | ................... | G01R 31/69 |

FOREIGN PATENT DOCUMENTS

| | | |
|---|---|---|
| DE | 19852560 A1 | 9/1999 |
| DE | 60019939 T2 | 2/2000 |

OTHER PUBLICATIONS

DE19852560 A1 English language translation.
DE60019939T2 English language translation.
German Patent Office Office Action for DE102020121614.9 dated Jun. 8, 2021 in German.
German Patent Office Office Action for DE102020121614.9 dated Jun. 8, 2021 in English.

* cited by examiner

*Primary Examiner* — Levi Gannon
(74) *Attorney, Agent, or Firm* — Jacob Eisenberg

(57) ABSTRACT

The present disclosure relates to an electrical connection arrangement for connecting freely configurable electrical components in a vehicle. The electrical connection arrangement includes a plurality of electrical plug connectors which are connected to each other by a plurality of electrical connection lines of an electrical wiring harness according to a first adjacency criterion, wherein a configuration code according to a second adjacency criterion is assigned to each of the plurality of connectors, where the configuration codes of the connectors indicate a specific configuration of the freely configurable electrical components of the vehicle; and where the plurality of electrical connectors is divided into a plurality of production modules based on a combination of the first adjacency criterion and the second adjacency criterion.

9 Claims, 13 Drawing Sheets

500

301 → $A_{ST}$

| Si/Si | Plug 1 | Plug 2 | Plug 3 | Plug 4 | Plug 5 | Plug 6 |
|---|---|---|---|---|---|---|
| Plug 1 | 0 | 5 | 0 | 0 | 15 | 0 |
| Plug 2 | 5 | 0 | 0 | 2 | 10 | 2 |
| Plug 3 | 0 | 0 | 0 | 6 | 0 | 16 |
| Plug 4 | 0 | 0 | 6 | 0 | 0 | 12 |
| Plug 5 | 15 | 10 | 0 | 0 | 0 | 4 |
| Plug 6 | 0 | 2 | 16 | 12 | 4 | 0 |

•

402 → $A_{SA}$

| Si/Si | Plug 1 | Plug 2 | Plug 3 | Plug 4 | Plug 5 | Plug 6 |
|---|---|---|---|---|---|---|
| Plug 1 | 0 | 1 | 1 | 2 | 4 | 6 |
| Plug 2 | 1 | 0 | 3 | 2 | 5 | 7 |
| Plug 3 | 1 | 3 | 0 | 0 | 5 | 5 |
| Plug 4 | 2 | 2 | 0 | 0 | 2 | 3 |
| Plug 5 | 4 | 5 | 5 | 2 | 0 | 10 |
| Plug 6 | 6 | 7 | 5 | 3 | 10 | 0 |

=

503 → $A_{RE}$

| Si/Si | Plug 1 | Plug 2 | Plug 3 | Plug 4 | Plug 5 | Plug 6 |
|---|---|---|---|---|---|---|
| Plug 1 | 0 | 5 | 0 | 0 | 60 | 0 |
| Plug 2 | 5 | 0 | 0 | 4 | 50 | 14 |
| Plug 3 | 0 | 0 | 0 | 0 | 0 | 80 |
| Plug 4 | 0 | 0 | 0 | 0 | 0 | 36 |
| Plug 5 | 60 | 50 | 0 | 0 | 0 | 0 |
| Plug 6 | 0 | 14 | 80 | 36 | 40 | 40 |

FIG. 5

| Si/Sj  | Plug 1 | Plug 2 | Plug 3 | Plug 4 | Plug 5 | Plug 6 |
|--------|--------|--------|--------|--------|--------|--------|
| Plug 1 | 0      | 5      | 0      | 0      | 60     | 0      |
| Plug 2 | 5      | 0      | 0      | 4      | 50     | 14     |
| Plug 3 | 0      | 0      | 0      | 0      | 0      | 80     |
| Plug 4 | 0      | 0      | 0      | 0      | 0      | 36     |
| Plug 5 | 60     | 50     | 0      | 0      | 0      | 40     |
| Plug 6 | 0      | 14     | 80     | 36     | 40     | 0      |

$[S_i, S_j] = S_i(S_{j\_max}), S_j$

| 1 | 5 |
| 2 | 5 |
| 3 | 6 |
| 4 | 6 |
| 5 | 1 |
| 6 | 3 |

FIG. 7A

$[S_i, S_j] = $ with $i,j \in$ Cluster $_1$

| 1 | 5 |
| 2 | 5 |
| 5 | 1 |

$[S_i, S_j] = $ with $i,j \in$ Cluster $_2$

| 3 | 6 |
| 6 | 3 |
| 4 | 6 |

FIG. 7B

|   | Plug1 | Plug2 | Plug3 | Plug4 | Plug5 | Plug6 |
|---|-------|-------|-------|-------|-------|-------|
| 1 | 0     | 5     | 0     | 0     | 15    | 0     |
| 2 | 5     | 0     | 0     | 2     | 10    | 2     |
| 3 | 0     | 0     | 0     | 6     | 0     | 16    |
| 4 | 0     | 0     | 6     | 0     | 0     | 12    |
| 5 | 15    | 10    | 0     | 0     | 0     | 4     |
| 6 | 0     | 2     | 16    | 12    | 4     | 0     |

FIG. 7C ical connection arrangement which is modularized in such a way, for example, based on a first adjacency criterion, which takes into account the neighboring relationships of the connectors with one another, and a second adjacency criterion, which takes into account the proximity relationships of the plugs to

ELECTRICAL CONNECTION ARRANGEMENT FOR CONNECTING FREELY CONFIGURABLE ELECTRICAL COMPONENTS IN A VEHICLE

CROSS REFERENCE TO RELATED APPLICATIONS

This application claims the priority benefit of German Application DE102020121614.9, filed on 18 Aug. 2020, the content of which is incorporated herein by reference.

BACKGROUND OF THE PRESENT DISCLOSURE

The present disclosure relates to an electrical connection arrangement for connecting freely configurable electrical components in a vehicle and to a method for generating a modular electrical connection arrangement. In particular, the present disclosure relates to an algorithm for modularization in wiring harness production.

The considerable variety of parts of the physical on-board network of vehicles, for example motor vehicles, is one of the obstacles to efficient automation in wiring harness assembly. In the conventional vehicle electrical system, there is a variety of freely configurable electrical components, such as display instruments, distance control, ABS/ESP, motor electronics, roof electronics, sunroof, heating, air conditioning, map readers, navigation, amplifiers, TV tuner, etc., which can be configured by the customer when purchasing the vehicle on individual customer request. Currently, production costs are determined by customer-specific cable sets of basic vehicles, which can be adapted to customer requirements by adding optional equipment (SA). The customer is provided with a selection list with extras from which he can flexibly configure his own vehicle. For example, he can choose whether he wants an additional heated seat or a navigation system, a hi-fi speaker, etc.

Whereas in the past a basic wiring harness was produced, in which unnecessary cables were returned, today a customer-specific wire harness or cable harness is produced, depending on the desired, i.e. cable set in which appropriate cables are available for the desired optional equipment. This results in a large variety of customer-specific cable harnesses and cable sets. This complexity is a disadvantage for automated production, since the cable assemblies can no longer be modularized in a simple way.

Today's main cable sets have a deep meshing. This deep meshing ensures that the large main cable set cannot be divided into concluded modules optimized for automated production. Although module production still exists today, these modules are not completed and therefore a manual re-pinning must be carried out during assembly, which usually has to be done by hand.

BRIEF SUMMARY OF THE INVENTION

An aim of the present disclosure is to provide an advantageous concept for modularization in the production of cable assemblies, wherein the effort for re-pinning the wiring harness is reduced with a plurality of optional equipment that can be configured in a customer-specific manner.

The present disclosure is based on the idea of appropriately exploiting the adjacency relationships, hereinafter also referred to as adjacencies, of the plug connectors among each other and of the plug connectors to the optional equipment, that is, customer-specific configurations, in a suitable manner in order to carry out efficient modularization.

In particular, the concept is based on multiplying the adjacency matrix of the plug connections with the adjacency matrix of the optional equipment (SA) affiliation. The resulting adjacency determines the plug with the highest affinity for each plug. These plug pairings can be thought of as "dominoes". Subsequently, the "dominoes" are aligned algorithmically. This results in clusters. The clusters have a minimal number of cross-connections among them, that violate independence. If there are no cross connections, completed clusters or modules are found.

The determination of the production modules with such an algorithm leads to more efficient modularization, which can then also be used for automated production.

Whereas in previous production, the modules are only determined once in advance before production starts, they can be determined dynamically and optimally for each vehicle by means of the new algorithm presented here and can be passed on to the automatic machines in a continuously digitized production process.

The following describes electrical connection arrangements with plug connectors and cable sets, which can be modularized using adjacency criteria and adjacency matrices. The term "adjacency" here means "neighborhood" or also "neighborhood relationship". An adjacent matrix may be used to map graphs with their nodes and edges in a matrix. The matrix stores the relationships between the nodes. Each node represents a row and a column in the matrix. The matrix is N×N in size for a number of N nodes. The entries in the columns and rows show whether nodes are connected to each other. The number 0" stands for no connection (no edge), the number 1" for an existing connection. Adjacent matrices can be used for different types of graphs such as directional graphs, undirected graphs or weighted graphs. For weighted graphs, the values are not 0" or 1", but numbers as weightings in the matrix. The adjacency matrix connects graph theory with linear algebra.

In the case of the adjacency criteria or adjacency matrices described in this disclosure, the nodes are formed by electrical plug connectors or plugs, and the edges are formed by electrical lines of the wiring harness, which interconnect the plug connector or connect the electrical components of the customized optional equipment.

According to a first aspect of the present disclosure, the problem is solved by an electrical connection arrangement for connecting freely configurable electrical components in a vehicle, wherein the electrical connection arrangement comprises a plurality of electrical plug connectors which are connected to one another by means of a plurality of electrical connection lines of an electrical wiring harness according to a first adjacency criterion, wherein the plurality of plug connectors are each assigned a configuration code according to a second adjacency criterion, the configuration codes of the plug connectors indicating a specific configuration of the freely configurable electrical components of the vehicle; wherein the plurality of electrical connectors are divided into a plurality of producing modules based on a combination of the first adjacency criterion and the second adjacency criterion.

The present disclosure relates to an electr the optional equipment, that is, customer-specific configurations and brings particularly efficient modularization. The electrical connection arrangement and the associated wiring harness can thus also be produced in an efficient manner in automated production.

According to an exemplary embodiment of the electrical connection arrangement, the production modules each comprise pairs of plug connectors whose combined adjacency with respect to the first adjacency criterion and the second adjacency criterion lies within identical ranges.

A technical advantage thus obtained is that the plug having the highest affinity can be determined for each plug from the resulting adjacency, that is, the combined adjacency with respect to the first adjacency criterion and the second adjacency criterion. These plug connector pairs can then be arranged in clusters or regions with a similar adjacency. These clusters have minimal interconnections that violate independence. If there are no cross connections, self-contained clusters or modules are found. This means that the wiring harness can thus be produced in a particularly efficient manner using automatic production. For a few cross connections, only a small re-pinning is required, for no cross connections, re-spinning is no longer required.

According to an exemplary embodiment of the electrical connection arrangement, the first adjacency criterion comprises a plug adjacency matrix which indicates a number of connection relationships between the plug connectors.

In this way, the technical advantage is achieved that the adjacency relationships between the plugs are taken into account in the modularization.

According to an exemplary embodiment of the electrical connection arrangement, the second adjacency criterion is based on a configuration matrix indicating for each plug connector, in particular by means of a bit, for which configurations connections are required for connection relationships.

This achieves the technical advantage that the various configurations or customer-specific special features are taken into account in the modularization.

According to an exemplary embodiment of the electrical connection arrangement, the configuration matrix comprises a weighting of the configuration codes according to a frequency of occurrence of the respective configuration codes.

This achieves the technical advantage that configurations or customer-specific configurations are possible. Customer-specific optional equipment, which is more common, receives a higher weighting in the configuration matrix and thus has a higher weight in modularization.

According to an exemplary embodiment of the electrical connection arrangement, the second adjacency criterion is based on a configuration adjacency matrix, which is used for combinations of plug connector pairs from the scalar product of two corresponding columns of the configuration matrix.

This achieves the technical advantage that the adjacency relationships of the respective configurations or customer-specific optional equipment can be taken into account in modularization.

According to an exemplary embodiment of the electrical connection arrangement, the combination of the first adjacency criterion and the second adjacency criterion is based on a combined adjacency matrix, which consists of a multiplication of the plug adjacency matrix with the configuration adjacency matrix.

This provides the technical advantage that both the adjacency relationships of the plugs to each other and of the respective configurations are taken into account in the modularization.

According to an exemplary embodiment of the electrical connection arrangement, the pairs of plug connectors comprising the production modules are those whose combined adjacency in the combined adjacency matrix is to a maximum.

Thus, the technical advantage is achieved that the production modules comprise such pairs of plug connectors that each have the highest adjacency relationship with each other.

According to an exemplary embodiment of the electrical connection arrangement, the division of the plurality of electrical plug connectors into the plurality of production modules is based on a sorting of the pairs of plug connectors, whose combined adjacency is to a maximum in the combined adjacent matrix.

This achieves the technical advantage that the pairs of plug connectors with the highest adjacency relationship can be efficiently arranged together in the production modules.

According to an exemplary embodiment of the electrical connection arrangement, the plurality of production modules have no or at least less electrical connecting lines among each other than the electrical plug connectors of the respective production modules among each other.

The technical advantage thus obtained is that completed modules or at least modules connected by only a few connecting lines are produced which can be produced automatically in a simple manner.

According to an exemplary embodiment of the electrical connection arrangement, the electrical connection arrangement comprises a data power interface (DPI) which is designed to unbundle the at least few electrical connection lines of the production modules from one another, so that the production modules are self-contained and do not have any electrical connection lines to other production modules.

A data power interface is a hardware component that provides the supply voltage and an interface for unbundling the data lines or data connection between the plug connectors.

This achieves the technical advantage that the DPI can easily unbundle the remaining connecting lines between the individual modules so that efficient automatic production can be established.

According to an exemplary embodiment of the electrical connection arrangement, the plurality of electrical plug connectors form a CAN topology, wherein the DPI is designed to form a star point of the CAN topology.

This provides the technical advantage that the DPI serves both to unbundle the supply lines and the data lines.

According to a second aspect of the present disclosure, the problem is solved by a method for generating a modular electrical connection arrangement for connecting freely configurable electrical components in a vehicle, wherein the method comprises the following steps: connecting a plurality of electrical plug connectors by means of a plurality of electrical wiring harness of an electrical wiring set to an electrical connecting arrangement according to a first adjacency criterion; assigning a configuration code according to a second adjacency criterion to the plurality of plug connectors, wherein the configuration codes of the plug connectors specify a specific configuration of the freely configurable electrical components of the vehicle, the plurality of electrical connectors is divided into a plurality of production modules based on a combination of the first adjacent criterion and the second adjacent criterion.

Such a method, which carries out such modularization of an electrical connection arrangement, that is, based on a first adjacency criterion, which takes into account the adjacency relationships of the plug connectors with one another, and a second adjacency criterion, which takes into account the adjacency relationships of the plugs to the optional equipment, that is, customer-specific configurations, provides particularly efficient modularization. An electrical connection arrangement produced by such a method and the associated electrical wiring harness can be produced particularly efficiently in automated production.

According to an exemplary embodiment of the method, the splitting comprises the following: determining respective pairs of plug connectors whose combined adjacency lies within the same ranges with respect to the first adjacency criterion and the second adjacency criterion.

The technical advantage thus obtained is that the plug with the highest affinity can be determined for each plug from the resulting adjacency, that is, the combined adjacency with respect to the first adjacency criterion and the second adjacency criterion. These plug connector pairs can then be arranged in clusters or areas with a similar adjacency. These clusters have minimal interconnections that violate independence. If there are no cross connections, completed clusters or modules are found. The wiring harness can thus be produced in a particularly efficient manner in automatic production. If there are only a few cross-connections, only a small amount of re-pinning is required; if there are no cross-connections, no more re-pinning is required.

According to an exemplary embodiment of the method, the splitting comprises the following: determining the respective pairs of plug connectors on the basis of a multiplication of a connector adjacency matrix with a configuration adjacency matrix, wherein the connector adjacency matrix indicates a number of connection relationships between the plug connectors, and wherein the configuration adjacency matrix is determined for combinations of plug connector pairs from the scalar product of two corresponding columns of a configuration matrix, which indicates for each plug connector for which configurations connections for connection relationships are required.

This provides the technical advantage that both the adjacency relationships between the plugs and the respective configurations are taken into account in the modularization.

According to a third aspect of the present disclosure, the problem is solved by an algorithm for generating a modular electrical connection arrangement for connecting freely configurable electrical components in a vehicle, wherein the algorithm comprises the following steps: connecting a plurality of electrical plug connectors to an electrical connection arrangement according to a first adjacent criterion via a plurality of electrical connecting lines of an electrical wiring harness; assigning a configuration code according to a second adjacency criterion to the plurality of connectors, wherein the configuration codes of the connectors indicate a specific configuration of the freely configurable electrical components of the vehicle, the plurality of electrical connectors is divided into a plurality of production modules based on a combination of the first adjacent criterion and the second adjacent criterion.

According to a fourth aspect of the present disclosure, the problem is solved by a computer program comprising a program code for carrying out the method according to the second aspect or the algorithm according to the third aspect when the program code runs on a computer or processor.

BRIEF DESCRIPTION OF THE SEVERAL VIEWS OF THE DRAWINGS

Further advantages features and details of the various embodiments of this disclosure will become apparent from the ensuing description of a preferred exemplary embodiment and with the aid of the drawings. The features and combinations of features recited below in the description, as well as the features and feature combination shown after that in the drawing description or in the drawings alone, may be used not only in the particular combination recited, but also in other combinations on their own, with departing from the scope of the disclosure. In the following, the present disclosure is described in more detail on the basis of embodiments and the figures, wherein:

FIG. 5 depicts a schematic representation 500 of an exemplary combined or resulting adjacency matrix ARE 503, which is formed from a combination of the plug adjacency matrix AST 301 with the configuration adjacency matrix ASA 402, according to an example embodiment;

FIG. 6 depicts a schematic representation of the combined adjacency matrix ARE 503 with an indication of the maximum combined adjacency values according to an example embodiment;

FIG. 7a depicts a schematic representation of the pairs of plug connectors 710, whose combined adjacency is maximum in the combined adjacency matrix ARE 503, according to an embodiment example;

FIG. 7b depicts a schematic representation splitting the pairs of plug connectors 710 into different clusters with a maximum combined adjacency according to an embodiment example;

FIG. 7c depicts a schematic representation of the plug adjacency matrix AST 301 identifying the two clusters 731, 732 and the remaining connections 733 between the two clusters, according to an embodiment example;

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of" "A, B, and C" should be understood as including only one of A, only one of B, only one of C, or any combination of A, B, and C.

In the following detailed description, reference is made to the accompanying drawings which form a part thereof and which show, by way of illustration, specific embodiments in which the present disclosure can be carried out. It is understood that other embodiments may also be used, and structural or logical changes may be made without deviating from the concept of the present disclosure. The following detailed description is therefore not to be understood in a restrictive sense. It is further understood that the characteristics of the various embodiments described herein may be combined, unless specifically stated otherwise.

The aspects and embodiments are described with reference to the drawings, with the same reference signs generally referring to the same elements. In the following description, for purposes of explanation, numerous specific details are set out to provide a thorough understanding of one or more aspects of the present disclosure. However, it may be obvious to a skilled person that one or more aspects or embodiments may be carried out with a lower degree of specific details. In other cases, known structures and elements are represented in a schematic form in order to facilitate the description of one or more aspects or embodiments. It is understood that other embodiments may be used, and structural or logical changes can be made without deviating from the concept of the present disclosure.

Figure 1:
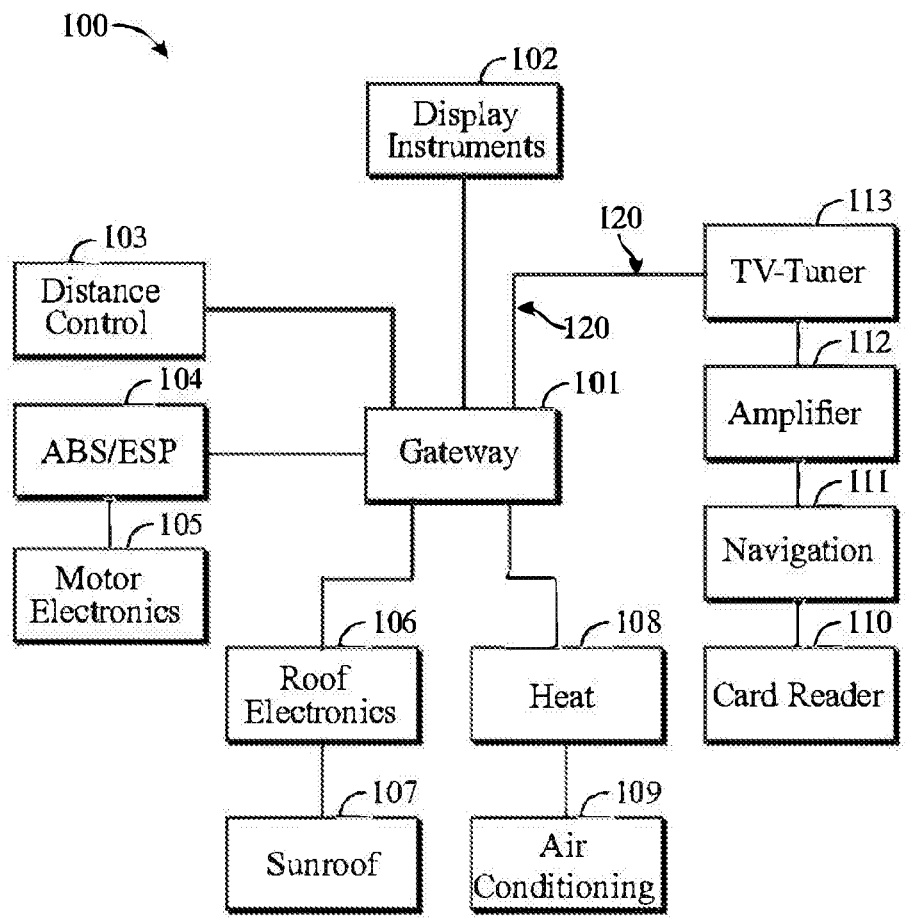
FIG. 1 depicts a schematic representation of an arrangement 100 of freely configurable electrical components in a vehicle which can be connected via a wiring harness.

FIG. 1 shows a schematic representation of an arrangement 100 of freely configurable electrical components in a vehicle, which can be connected via a wiring harness.

The arrangement represents a part of an on-board electrical system of a vehicle, for example of a motor vehicle. A plurality of freely configurable electrical components is interconnected via a cable harness 120 via a gateway 101. In this example, the following electrical components are shown: display instruments 102, distance control 103, ABS/ESP 104, motor electronics 105, roof electronics 106, sunroof 107, heating 108, air conditioning 109, card reader 110, navigation 111, amplifier 112, TV tuner 113. The on-board network may include other components not shown here, which are connected to the gateway 101 via cable harness 120.

The electrical components are freely configurable by the customer, meaning that they can be selected or omitted during the ordering process with software support. Depending on the customer-specific equipment, here referred to as optional equipment (SA), a corresponding cable harness 120 is specified, which selects the electrical components 102, 103, 104, 105, 106, 107, 108, 109, 110, 111, 112, according to the customer's individual requirements, 113 and provides cabling for the selected components. In industrial production, it is advantageous if the cable harness 120 consists of self-contained modules in order to reduce the effort required for (manual) re-pinning. The methods, arrangements and algorithms presented in this disclosure show how such modularization can be advantageously achieved.

Figure 2:
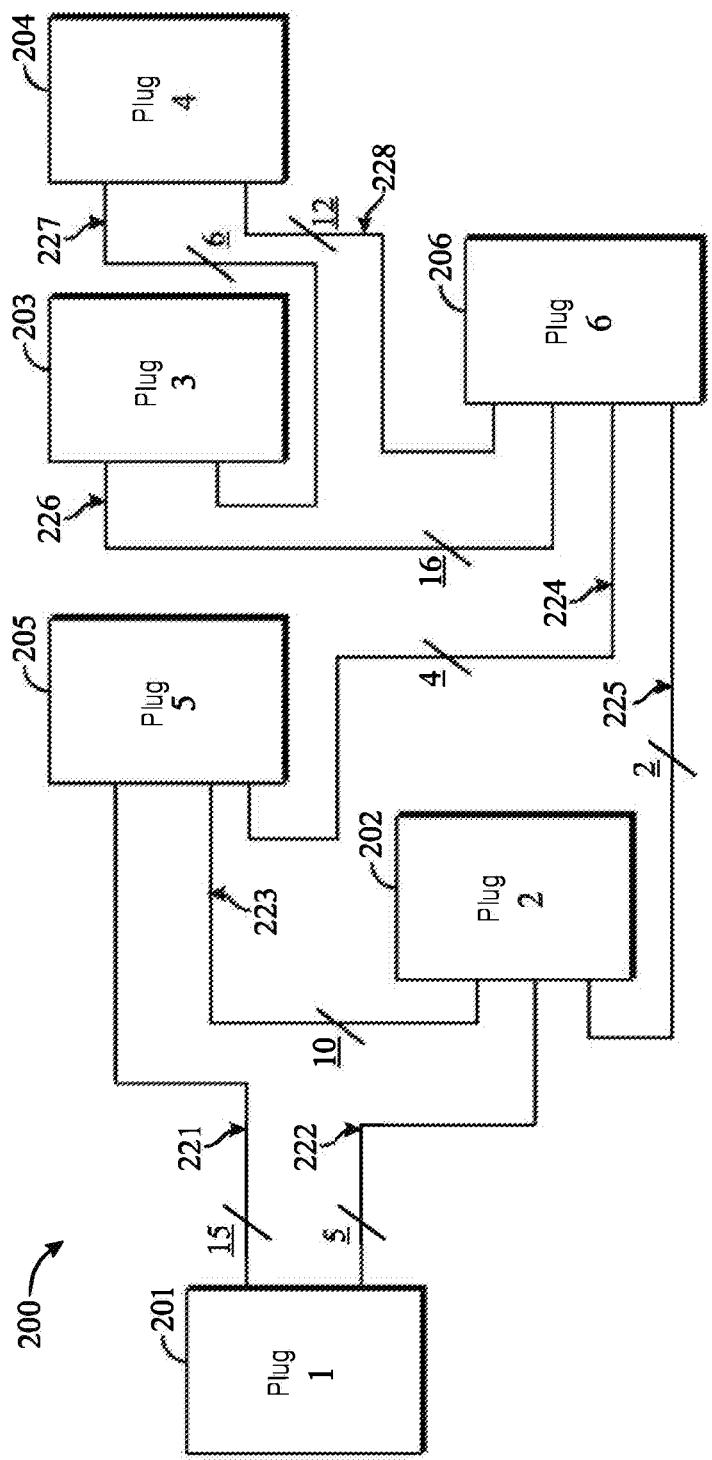
FIG. 2 depicts a schematic representation of an exemplary electrical connection arrangement 200 to be modularized according to an example embodiment.

FIG. 2 shows a schematic representation of an exemplary electrical connection arrangement 200 which is to be modularized according to an example embodiment.

The electrical connection arrangement 200 comprises an exemplary number of six plug connectors or plugs 201, 202, 203, 204, 205, 206 which are interconnected via a plurality of electrical connecting lines 221, 222, 223, 224, 225, 226, 227, 228.

221 denotes the electrical connection line from plug 1 to plug 5, 222 denotes the electrical connection line from plug 1 to plug 2, 223 denotes the electrical connection line from plug 2 to plug 5, 224 designates the electrical connection line from plug 6 to plug 5, 225 designates the electrical connection line from plug 2 to plug 6, 226 designates the electrical connection line from plug 3 to plug 6, 227 denotes the electrical connection line from plug 3 to plug 4 and 228 denotes the electrical connection line from plug 4 to plug 6.

In this example, the connection cable 221 comprises an exemplary number of 15 single wires, the connection cable 222 comprises an exemplary number of 5 single wires, the connection 223 comprises an exemplary number of 10 single wires, the connection cable 224 comprises an exemplary number of 4 single wires, the connection cable 225 comprises an exemplary number of 2 single wires, the connection cable 226 comprises an exemplary number of 16 single wires, the connection cable 227 comprises an exemplary number of 6 single wires and the connection cable 228 comprises an exemplary number of 12 single wires.

Figure 3:
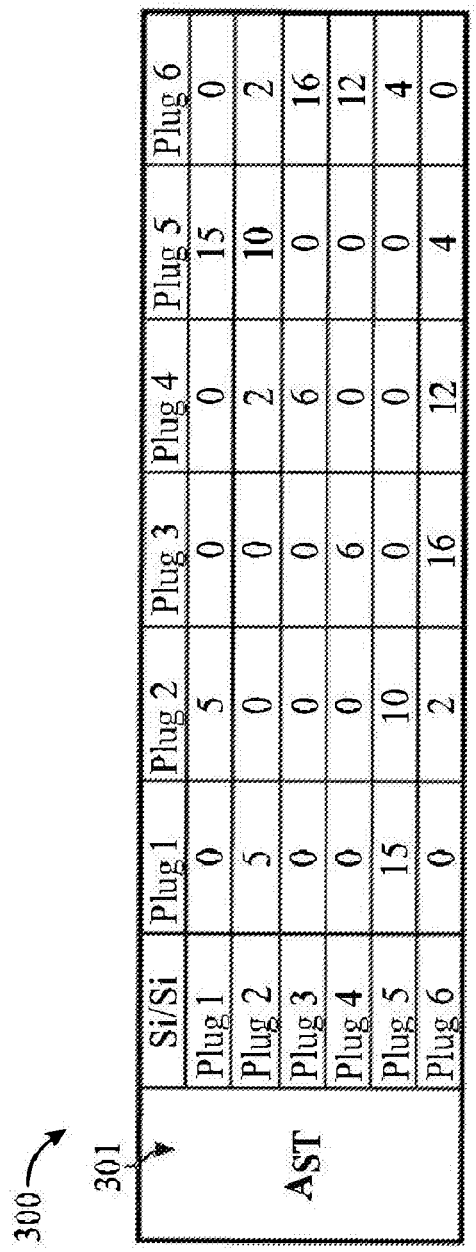
FIG. 3 depicts a schematic representation of an example plug adjacency matrix AST 301 corresponding to a first adjacency criterion 300 according to an example embodiment.

The plug adjacency matrix AST to this connector arrangement 200, which indicates which connector has how many connection relationships with which other connector, is shown in FIG. 3.

FIG. 3 shows a schematic representation of an exemplary plug adjacency matrix AST 301 corresponding to a first adjacency criterion 300 according to an embodiment example.

The plug adjacency matrix AST is a symmetrical matrix whose number of columns and rows corresponds to the number of plugs of the electrical connection arrangement 200 from FIG. 2. The elements of the plug adjacency matrix AST indicate how many wires (that is, single wires) run from one plug Si to another plug Sj. If there is no connection, the value is zero.

FIG. 2 shows that 5 lines lead from plug 1 to plug 2, and 15 lines from plug 1 to plug 5, giving the first column of the plug adjacency matrix AST to: (0, 5, 0, 0, 15, 0) that 10 lines lead from plug 2 to plug 5, 5 lines from plug 2 to plug 1 and 2 lines from plug 2 to plug 6. This results in the second column of the plug adjacency matrix AST to: (5, 0, 0, 0, 10, 2) that 16 lines lead from plug 3 to plug 6 and 6 lines from plug 3 to plug 4. Thus, the third column of the plug adjacency matrix AST results in: (0, 0, 0, 6, 0, 16) T. In addition, it can be seen that 6 lines lead from plug 4 to plug 3 and 12 lines from plug 4 to plug 6. This gives the fourth column of the plug adjacency matrix AST to: (0, 0, 6, 0, 0, 12) that 15 lines lead from plug 5 to plug 1, 10 lines from plug 5 to plug 2 and 4 lines from plug 5 to plug 6. This results in the fifth column of the plug adjacency matrix AST to: (15, 10, 0, 0, 0, 4) that 12 lines lead from plug 6 to plug 4, 16 lines from plug 6 to plug 3, 4 lines from plug 6 to plug 5 and 2 lines from plug 6 to plug 2. Thus, the sixth column of the plug adjacency matrix AST results in: (0, 2, 16, 12, 4, 0) T.

Figure 4:
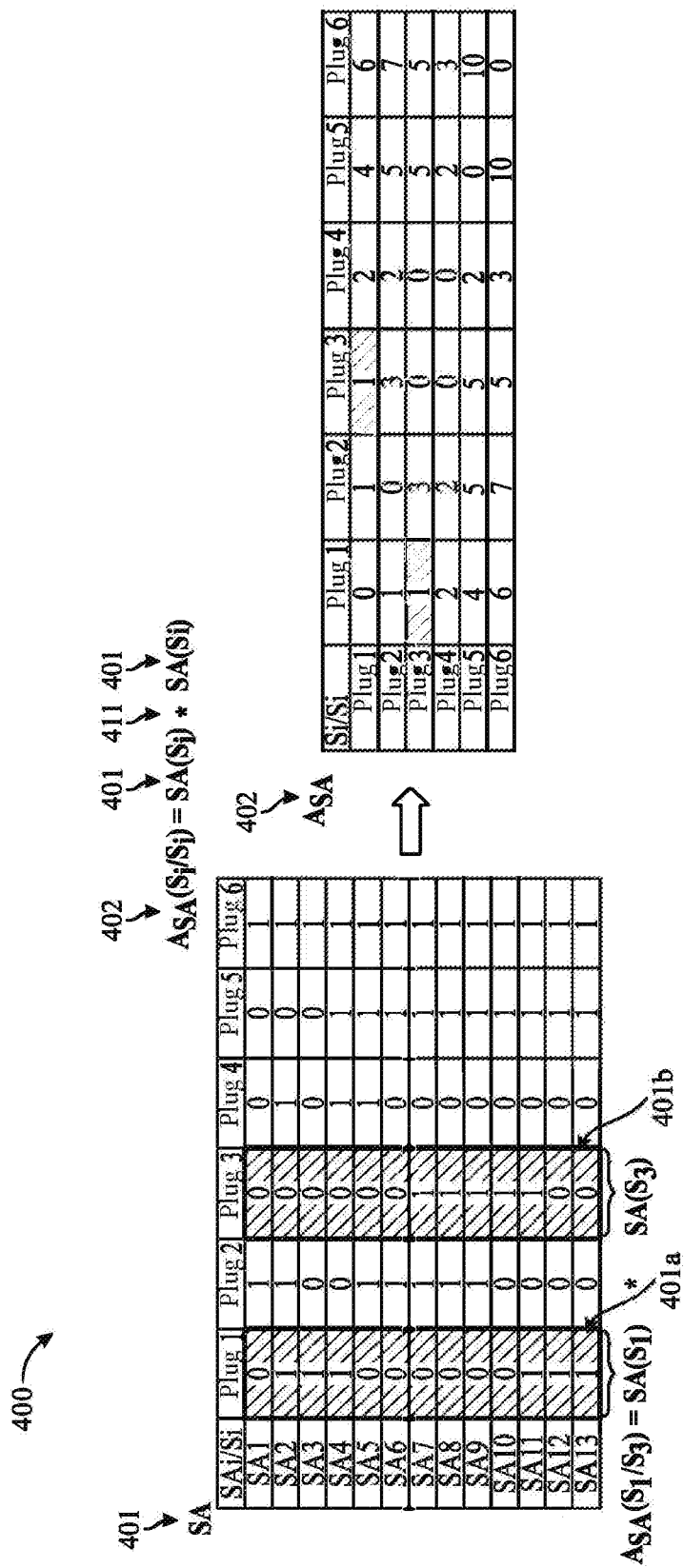
FIG. 4 depicts a schematic representation of an exemplary configuration matrix or optional equipment matrix SA 401 as well as the associated configuration adjacency matrix ASA 402 corresponding to a second adjacency criterion 400 according to an example embodiment.

FIG. 4 shows a schematic representation of an exemplary configuration matrix or optional equipment matrix SA 401 and the corresponding configuration adjacency matrix ASA 402 according to a second adjacency criterion 400 according to an embodiment.

In addition to the connection relationships, the relationship via the assignment to configurations or optional equipment (SAs) is important, which is represented by configuration codes or SA codes. To ensure that the SA affiliation is reflected in the module formation, a SA adjacency matrix 402 or configuration adjacency matrix 402 is illustrated from the SA list 401. The SA List 401 or configuration list 401 can be represented as a SA 401 configuration matrix.

The SA matrix or configuration matrix SA 401 lists for each plug connector 201, 202, 203, 204, 205, 206 for which SAs or SAs or configurations 401*a*, 401*b* connection relationships are required. In this example, the connector 1 contains lines for the SAs 2, 3, 4, 11, 12 and 13 according to the configuration 401*a* and the connector 3 contains lines for the SAs 7, 8, 9, 10, 11 according to the configuration 401*b*.

In this example, all SAs are equally weighted (with 1). In principle, a smaller weighting, smaller than 1, can also be carried out, for example according to the take rate (TR). The take rate represents the occurrence frequency of the individual configurations or SAs. If a certain configuration is often chosen by many customers, this configuration receives a high take rate corresponding to a high frequency of occurrence. If a certain configuration is only selected by a few customers, this configuration receives a low take rate corresponding to a low frequency of occurrence. The take rate can be taken into account by adjusting a weight of VTR in the configurations or SAs.

The SA adjacency 402 or configuration adjacency matrix 402 can be determined from the scalar product 411 of two columns S1/S2 of the SA matrix or configuration matrix 401, respectively, for all columns S1 and S2, as shown in FIG. 4.

FIG. 5 shows a schematic representation 500 of an exemplary combined or resulting adjacency matrix ARE 503, which is formed from a combination of the plug adjacency matrix AST 301 with the configuration adjacency matrix ASA 402, according to an embodiment example.

For a suitable modularization of the connection arrangement 200 from FIG. 2, both the plug adjacency matrix AST 301 and the configuration adjacency matrix ASA 402 should be considered.

The resulting adjacency matrix ARE, also referred to here as the combined adjacency matrix ARE 503, is the product of the adjacency matrices for plug connector connection relationships AST 301 with the one for SA relationship ASA 402: ARE=AST ASA.

This matrix 503 is suitable to determine for each plug Si a plug Sj to which this plug has the greatest affinity (i.e., the highest adjacency value).

FIG. 6 shows a schematic representation of the combined adjacency matrix ARE 503 with identification of the maximum combined adjacency values according to an embodiment example.

This combined adjacency matrix ARE 503 is suitable to determine for each plug Si a plug Sj to which this plug has the greatest affinity (that is, the highest adjacency value). For example, the combined adjacency matrix ARE 503 shows that the plug 5 to plug 1 has the highest adjacency value, namely 60, to plug 2, plug 5 has the highest adjacency value, namely 50, to plug 3, plug 6 has the highest adjacency value, namely 80, to plug 4, plug 6 has the highest adjacency value, namely 36, to plug 5, plug 1 has the highest adjacency value, namely 60, and to plug 6, plug 3 has the highest adjacency value, namely 80.

The resulting "affinity pairs" can be represented as tuples of two, as shown in FIG. 7*a*.

FIG. 7*a* shows a schematic representation of the pairs of plug connectors 710, whose combined adjacency is to a maximum in the combined adjacency matrix ARE 503, according to an embodiment example.

These pairs of plug connectors 710 correspond to the affinity pairs described in FIG. 6. This means that a first pair consists of plug 1 and plug 5, which have the highest adjacency to each other. A second pair consists of plug 2 and plug 5, which have the highest adjacency to each other. A third pair consists of plug 3 and plug 6, which have the highest adjacency to each other. A fourth pair consists of plug 4 and plug 6, which have the highest adjacency to each other. A fifth pair consists of plug 5 and plug 1, which have the highest adjacency to each other. A sixth pair consists of plug 6 and plug 3, which have the highest adjacency to each other.

The "affinity pairs" are like dominoes, that are combined by a sorting algorithm according to matching "scores", as detailed in FIG. 7*b*.

FIG. 7*b* shows a schematic diagram division of pairs of plug connectors 710 with maximum combined adjacency into different clusters 720, 721 according to an embodiment example.

The "merging of the dominoes" or the tuples of two are combined by means of a simple sorting algorithm, which recognizes matching elements of the tuples and combines such tuples in a set. FIG. 7*b* shows that plug 5 occurs in three tuples where plug 6 does not occur, while plug 6 occurs in three tuples where plug 5 does not occur. In this example, two clusters "720, 721 or "clumps" have formed. The first cluster 720 comprises the tuples with plug 5, while the second cluster 721 comprises the tuples with plug 6. These clusters are the basis for module formation.

FIG. 7*c* shows a schematic representation of the plug adjacency matrix AST 301 with identification of the two clusters 731, 732 as well as the remaining connections 733 between the two clusters according to an embodiment example.

The two clusters are identified by their respective reference characters 731 and 732 in the plug adjacency matrix AST 301. It can be seen that there are still connections between the two clusters. Thus, plug 2 has two connections 733 with plug 6 and plug 5 has four connections 733 with plug 6. Thus, it is not yet possible to display completed modules, as shown in FIG. 8, because there are still connections between the two modules 801, 802.

Figure 8:
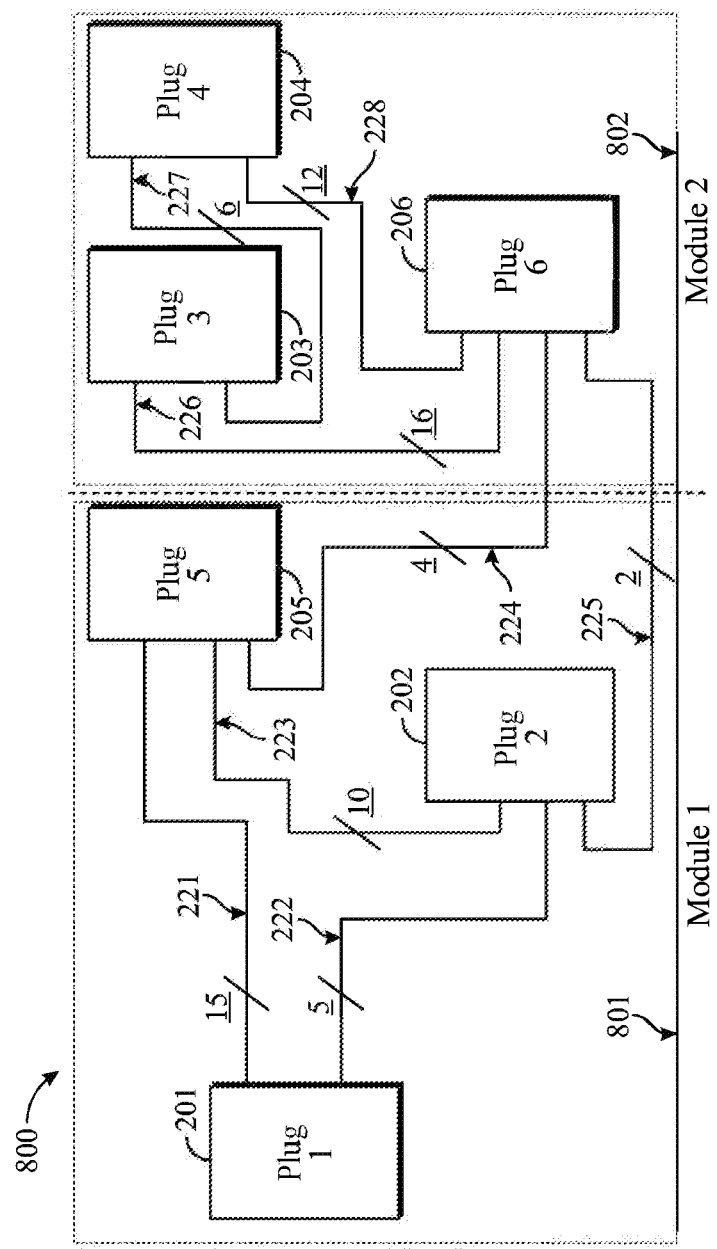
FIG. 8 depicts a schematic representation of a modularized electrical connection arrangement 800 according to an embodiment example.

FIG. 8 shows a schematic representation of a modularized electrical connection arrangement 800 according to an embodiment example.

The electrical connection arrangement 800 is used to connect freely configurable electrical components in a vehicle, for example components 102, 103, 104, 105, 106, 107, 108, 109, 110, 111, 112, 113 as shown in FIG. 1.

The electrical connection arrangement 800 comprises a plurality of electrical plug connectors 201, 202, 203, 204, 205, 206, which are connected via a plurality of electrical connecting lines 221, 222, 223, 224, 225, 226, 227, 228 of an electrical wiring harness according to a first adjacency criterion 300, AST (see FIG. 3).

The plurality of plug connectors 201, 202, 203, 204, 205, 206 is each assigned a configuration code 401a, 401b (see FIG. 4) according to a second adjacency criterion 400, ASA. The configuration codes 401a, 401b of the plug connectors 201, 202, 203, 204, 205, 206 indicate a specific configuration of the freely configurable electrical components 102, 103, 104, 105, 106, 107, 108, 109, 110, 111, 112, 113 of the vehicle.

The plurality of electrical plug connectors 201, 202, 203, 204, 205, 206 is divided into a plurality of production modules 801, 802 based on a combination of the first adjacent criterion 300, AST and the second adjacent criterion 400, ASA.

The production modules 801, 802 can each comprise pairs of plug connectors 710 whose combined adjacency 503, ARE (see FIG. 5) with respect to the first adjacency criterion 300, AST and the second adjacency criterion 400, ASA within equal ranges 720, 721 (see FIG. 7a, b, c).

The first adjacency criterion 300, AST may comprise a plug adjacency matrix 301, AST, as described in FIG. 3, which specifies a number of connection relationships of the plug connectors 201, 202, 203, 204, 205, 206 among each other.

The second adjacency criterion 400, ASA may be based on a configuration matrix 401, SA, which specifies connections for each plug connector 201, 202, 203, 204, 205, 206, in particular by means of a bit, for which configurations connections for connection relationships are required.

The configuration matrix 401, SA may comprise a weighting of configuration codes 401a, 401b according to a frequency of occurrence of the respective configuration codes 401a, 401b as described in FIG. 4.

The second adjacency criterion 400, ASA (see FIG. 4) may be based on a configuration adjacency matrix 402, ASA, determined for combinations of plug connector pairs Si, Sj from the scalar product 411 of two corresponding columns 401a, 401b of the configuration matrix 401, SA as described in more detail in FIG. 4.

The combination of the first adjacent criterion 300, AST and the second adjacent criterion 400, ASA may be based on a combined adjacent matrix 503, ARE, which consists of a multiplication of the plug adjacent matrix 301, AST with the configuration adjacency matrix 402, ASA, as for example described in more detail in FIG. 5.

The pairs of plug connectors 710, Si, Sj, that make up the production modules 801, 802, may in particular be those whose combined adjacency 503, ARE in the combined adjacency matrix 503, ARE is maximum, as described for example in more detail in FIG. 5.

The division of the plurality of electrical plug connectors 201, 202, 203, 204, 205, 206 into the plurality of producing modules 801, 802 may be based on a sorting of the pairs of plug connectors 710, Si, Sj, whose combined adjacency 503, ARE in the combined adjacent matrix 503, ARE maximum, such as described in more detail with respect to FIG. 5.

The plurality of manufacturing modules 801, 802 have no or at least fewer electrical connection lines 224, 225 between them than the electrical plug connectors 201, 202, 203, 204, 205, 206 of the respective production modules 801, 802 between them.

Figure 9:
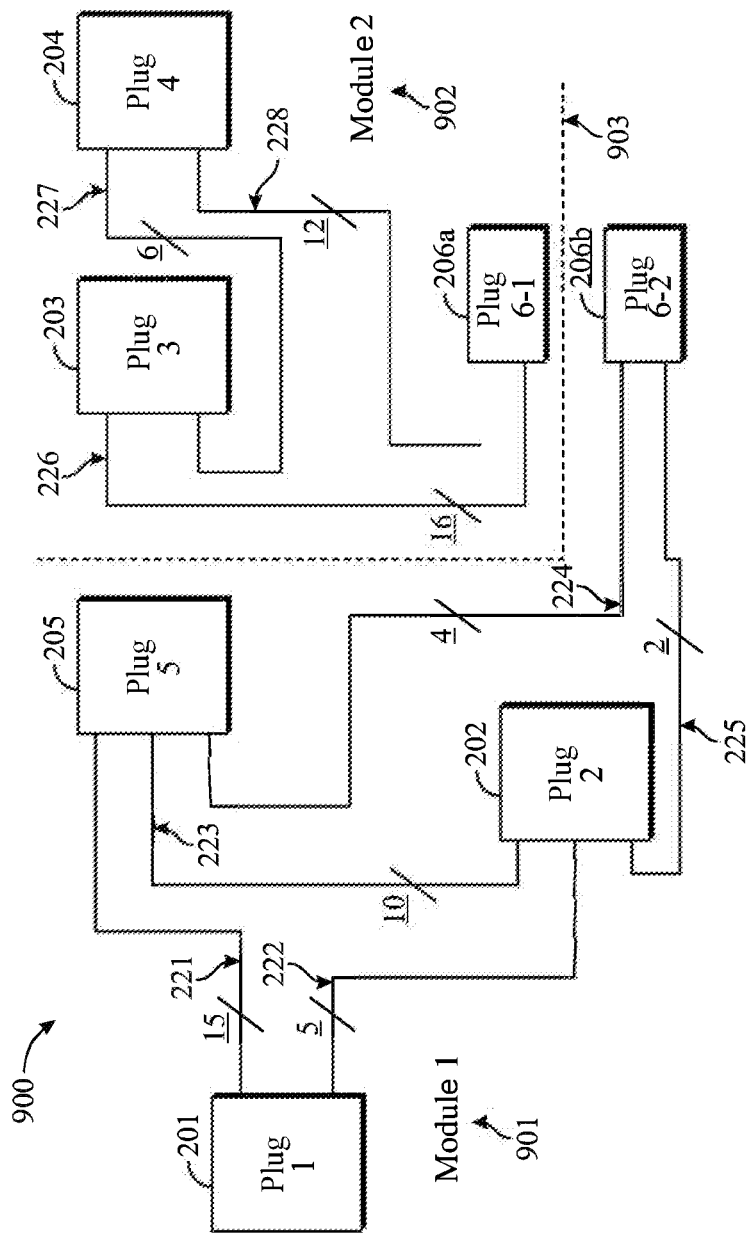
FIG. 9 depicts a schematic representation of a modularized electrical connection arrangement 900 with a division of a plug according to an embodiment example.

FIG. 9 shows a schematic representation of a modularized electrical connection arrangement 900 with a division of a plug according to an embodiment example.

The configuration of the electrical connection arrangement 900 corresponds to the configuration of the connection arrangement 800 shown in FIG. 8.

The connection arrangement 800 shows that connecting lines still exist across the modules 801, 802. These would need to be reconnected. This means that the cables of plug 2 and plug 5 have to be inserted into plug 6 in the assembly.

A sufficient action is immediately clear from the adjacency matrix: plug 6 would have to be divided. FIG. 9 shows the modularized electrical connection arrangement 900, in which plug 6 is divided into a first partial plug 6_1, 206a and a second partial plug 6_2, 206b.

With the division of the plug 6, the line 228 of plug 4 and the line 226 of plug 3 are also led into the first partial plug 6_1. On the other hand, the line 224 of plug 5 and the line 225 of plug 2 are led into the second partial plug 6_2.

A division of connectors is not always possible, especially if existing function control units are taken over due to legacy. In order to nevertheless achieve a closed module, an unbundling can be carried out in a DPI, as described in FIG. 10.

Figure 10:
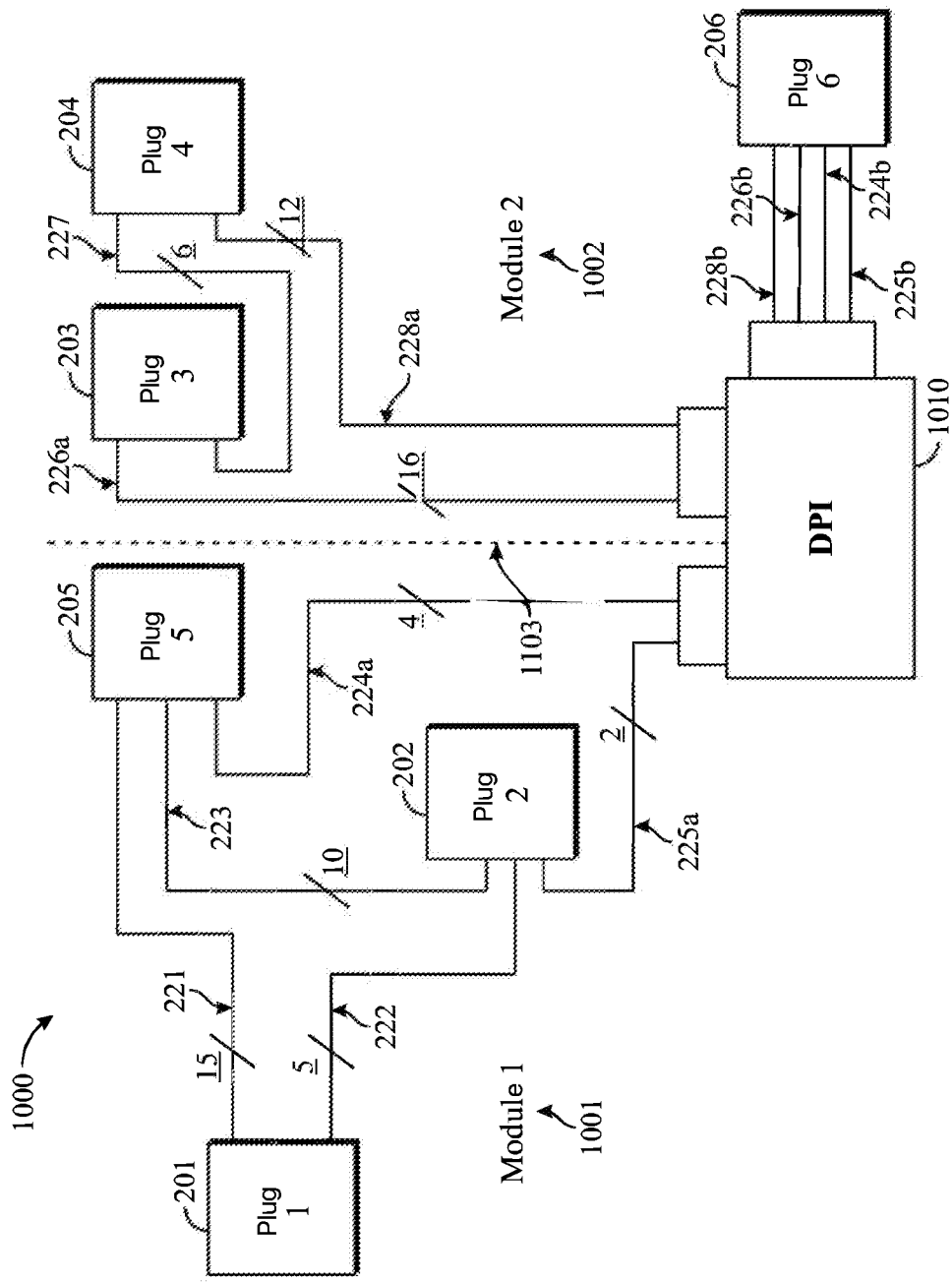
FIG. 10 depicts a schematic representation of a modularized electrical connection arrangement 1000 with a division of a plug according to an embodiment example.

FIG. 10 shows a schematic representation of a modularized electrical connection arrangement 1000 with a division of a plug according to an embodiment example.

The configuration of the electrical connection arrangement 1000 corresponds to the configuration of the 800 connection arrangement shown in FIG. 8.

The connection arrangement 800 shows that connecting lines still exist across the modules 801, 802. These would need to be plugged in. This means that the cables of plug 2 and plug 5 have to be inserted into plug 6 in the assembly.

In order to avoid such re-pinning, FIG. 10 shows a different solution based on the use of a data power interface (DPI).

The Data Power Interface is a hardware component that provides the supply voltage and provides an interface for unbundling the data lines or data connections between the plug connectors.

The Data Power Interface, DPI, 1010 is designed to disentangle the at least few electrical connecting cables 224, 225 of the production modules 801, 802 from each other, so that the production modules 801, 802 are self-contained and do not have any electrical connection lines to other 801, 802 production modules.

FIG. 10 shows the modularized electrical connection arrangement 1000, in which the connection line 225 is divided from plug 2 to plug 6 into a first partial connection line 225a, which connects plug 2 to the DPI 1010 and a second partial connection line 225b, which connects the DPI 1010 with plug 6.

The connecting line 224 from plug 5 to plug 6 is divided into a first partial connecting line 224a, which connects plug 5 to the DPI 1010 and a second partial connecting line 224b, which connects the DPI 1010 to plug 6.

The connecting line 226 from plug 3 to plug 6 is divided into a first partial connecting line 226a, which connects plug 3 to the DPI 1010 and a second partial connecting line 226b, which connects the DPI 1010 to plug 6.

The connecting line 228 from plug 4 to plug 6 is divided into a first partial connecting line 228a, which connects plug 4 to the DPI 1010 and a second partial connecting line 228b, which connects the DPI 1010 to plug 6.

For example, the plurality of electrical plug connectors 201, 202, 203, 204, 205, 206 may form a CAN topology. Thus, the DPI 1010 may be formed as a power distributer of the CAN topology in addition to its function as a power distributor.

Figure 11:
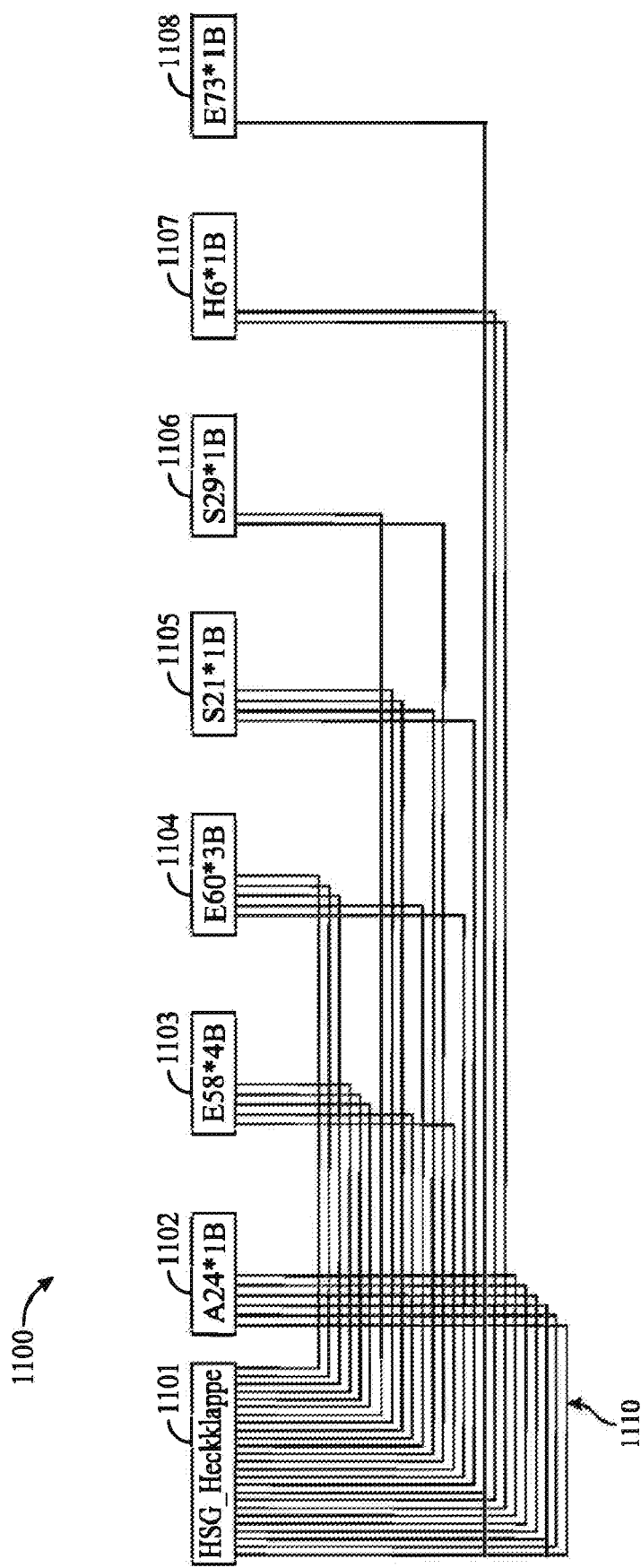
FIG. 11 depicts a schematic representation of a modularized electrical connection arrangement 1100 according to an embodiment example.

FIG. 11 shows a schematic representation of a modularized electrical connection arrangement 1100 according to an example embodiment.

In particular, FIG. 11 shows the visualization of a completed module identified by the algorithm using the example of a tailgate 1101 connected to the electrical components 1102, 1103, 1104, 1105, 1106, 1107 and 1108 via the wiring harness 1110.

Figure 12:
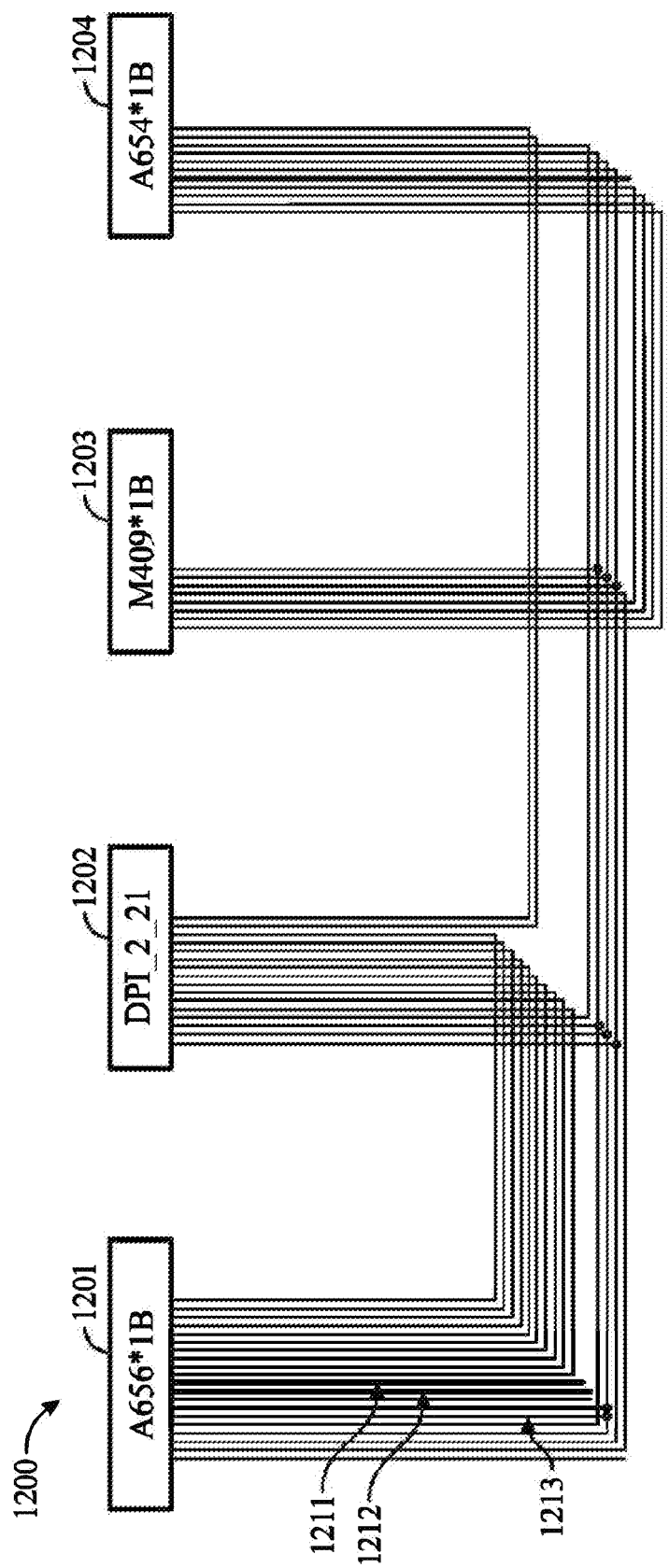
FIG. 12 depicts a schematic representation of a modularized electrical connection arrangement 1200 according to an embodiment example.

FIG. 12 shows a schematic representation of a modularized electrical connection arrangement 1200 according to an example embodiment.

In particular, FIG. 12 shows the visualization of another module using the example of a charging socket electronics. Here, the DPI with its plug_2_21, 1202 already provides an unbundling for all (long) lines that go to the control units in the front car. However, the three lines 1211, 1212, 1213 from another module are still having to be pinned, so that the unbundling has not yet been achieved. It can be reached if these three connections 1211, 1212, 1213 are also routed via the DPI 1202.

Figure 13:
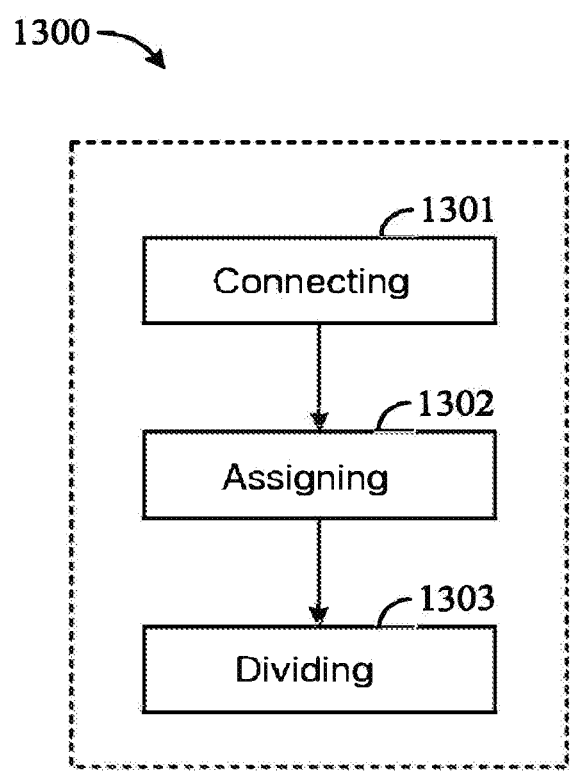
FIG. 13 depicts a schematic representation of a method 1300 for producing a modular electrical connection arrangement according to an embodiment example.

FIG. 13 shows a schematic representation of a method 1300 for generating a modular electrical connection arrangement according to an example embodiment.

The method 1300 is for generating a modular electrical connection arrangement for connecting freely configurable electrical components 102, 103, 104, 105, 106, 107, 108, 109, 110, 111, 112, 113 in a vehicle, such as a modular electrical connection arrangement 800, 900, 1000, 1100, 1200, as shown in FIGS. 8 to 12.

The method 1300 comprises the following steps:

Connecting 1301 of a plurality of electrical plug connectors 201, 202, 203, 204, 205, 206 (see FIG. 2) via a plurality of electrical connecting lines 221, 222, 223, 224, 225, 226, 227, 228 (see FIG. 2) of an electrical wiring harness to an electrical connection 800, 900, 1000, 1100, 1200 (see FIGS. 8 to 12) according to a first adjacency criterion 300, AST, as described in more detail, for example in FIG. 8;

Assigning 1302 of a configuration code 401a, 401b according to a second adjacency criterion 400, ASA (see FIG. 4) to the plurality of plug connectors 201, 202, 203, 204, 205, 206, wherein the configuration codes 401a, 401b of the plug connector 201, 202, 203, 204, 205, 206 indicate a specific configuration of the freely configurable electrical components 102, 103, 104, 105, 106, 107, 108, 109, 110, 111, 112, 113 of the vehicle, as further described for example in FIG. 8; and Dividing 1303 of the plurality of electrical plug connectors 201, 202, 203, 204, 205, 206 based on a combination of the first adjacency criterion 300, AST and the second adjacency criterion 400, ASA into a plurality of production modules 801, 802, as described in detail for example in FIG. 8.

Splitting 1303 may include: determining respective pairs of plug connectors 710, Si, Sj (see FIG. 7), their combined adjacency 503, ARE (see FIG. 5) with respect to first adjacency criterion 300, AST and second adjacency criterion 400; ASA is located within equal ranges 720, 721.

The dividing 1303 may include: determining the respective pairs of plug connectors 710, Si, Sj based on a multiplication of a connector adjacency matrix 301, AST with a configuration adjacency matrix 402, ASA, wherein the connector adjacency matrix 301, AST specifies a number of connection relationships of the plug connectors 201, 202, 203, 204, 205, 206 among each other, wherein the configuration adjacency matrix 402, ASA is suitable for combinations of plug connector pairs 710, Si, Sj from the scalar product 411 of two corresponding columns 401a, 401b of a configuration matrix 401, SA (see FIG. 4), which specifies for each plug connector 201, 202, 203, 204, 205, 206 for which configurations connections for connection relationships are required.

The method 1300 may be implemented as an algorithm that performs the steps described above with respect to FIGS. 2 through 8. In summary, the following computational operations are performed:

1) Determine the adjacency matrix AST of the plug connectors;
2) Calculating the SA (optional equipment) adjacency matrix:

$ASA(Si/Sj)=SA(Si)*SA(Sj)$;

3) Calculating the resulting adjacency matrix:

$ARE=AST\ ASA$;

4) Calculation of two tuples with the highest resulting adjacency:

$[Si,Sj]=ARE(Si(Sj\_max),Sj)$;

5) Sorting according to the criterion that same tuple elements are present:

i. Sort: $Si\_n=Sj\_m\ U\ Si\_m=Sj\_n$.

In so doing indicate:
* the scalar product,
● the element-by-element product; and
U the union quantity.

The invention claimed is:

1. An electrical connection arrangement for connecting freely configurable electrical components in a vehicle, the arrangement comprising:
a plurality of electrical plug connectors connected via a plurality of electrical connection lines of an electrical wiring harness according to a first adjacency criterion;
wherein the plurality of connectors is each assigned a configuration code according to a second adjacency criterion, the configuration codes of the connectors configured to indicate a specific configuration of the freely configurable electrical components of the vehicle;
wherein the plurality of electrical connectors is divided into a plurality of production modules based on a combination of the first adjacent criterion and the second adjacent criterion;
wherein respective pairs of connectors are based on a multiplication of a plug connector adjacency matrix with a configuration adjacency matrix, wherein the plug adjacency matrix comprises connection relationships between the plug connectors, and
wherein a configuration adjacency matrix for combinations of plug connector pairs from the scalar product of two corresponding columns of the configuration matrix are configured for each plug connector whose configurations require connections for connection relationships.

2. The electrical connection arrangement according to claim 1, wherein the production modules each comprise pairs of connectors, the combined adjacency with respect to the first adjacency criterion and the second adjacency criterion of which lies within the same ranges.

3. The electrical connection arrangement according to claim 1, wherein the first adjacency criterion comprises a plug adjacency matrix which specifies connection relationships between the plug connectors.

4. The electrical connection arrangement according to claim 3, wherein the second adjacency criterion comprises a configuration matrix which specifies connections for each connector by means of a bit for which configurations connections are required for connection relationships.

5. The electrical connection arrangement according to claim 4, wherein the configuration matrix comprises a weighting of the configuration codes according to an occurrence frequency of the respective configuration codes.

6. The electrical connection arrangement according to claim 1, wherein the plurality of electrical connectors is partitioned into the plurality of production modules based on a sorting of the pairs of connectors whose combined adjacency in a combined adjacent matrix is at a maximum.

7. The electrical connection arrangement according to claim 1, wherein the plurality of production modules have no or at least less electrical connecting lines among each other than the electrical connectors of the respective production modules among each other.

8. A method for generating a modular electrical connection arrangement for connecting freely configurable electrical components in a vehicle, the method comprising the steps of:

connecting a plurality of electrical plug connectors to an electrical connection arrangement via a plurality of electrical connection lines of an electrical wiring harness according to a first adjacency criterion;

assigning a configuration code according to a second adjacency criterion to the plurality of plug connectors, wherein the configuration codes of the connectors comprise a specific configuration of the freely configurable electrical components of the vehicle;

dividing the plurality of electrical connectors into a plurality of production modules on the basis of a combination of the first adjacent criterion and the second adjacent criterion;

determining respective pairs of connectors based on a multiplication of a plug connector adjacency matrix with a configuration adjacency matrix, wherein the plug adjacency matrix comprises connection relationships between the plug connectors, and determining a configuration adjacency matrix for combinations of plug connector pairs from the scalar product of two corresponding columns of the configuration matrix which is intended for each plug connector whose configurations require connections for connection relationships.

9. The method according to claim 8, wherein the step of dividing further comprises the steps of determining respective pairs of connectors whose combined adjacency is within equal ranges with respect to the first adjacency criterion and the second adjacency criterion.

* * * * *